(12) United States Patent
Lee et al.

(10) Patent No.: US 8,256,278 B2
(45) Date of Patent: Sep. 4, 2012

(54) ENGINE MISFIRE DETECTION SYSTEMS AND METHODS USING DISCRETE FOURIER TRANSFORM APPROXIMATION

(75) Inventors: Byungho Lee, Ann Arbor, MI (US); Hoon Lee, Peoria, IL (US); Jeffrey A. Morgan, Macomb, MI (US)

(73) Assignee: GM Global Technology Operations LLC

( * ) Notice: Subject to any disclaimer, the term of this patent is extended or adjusted under 35 U.S.C. 154(b) by 275 days.

(21) Appl. No.: 12/770,061

(22) Filed: Apr. 29, 2010

(65) Prior Publication Data
US 2011/0265560 A1  Nov. 3, 2011

(51) Int. Cl.
*G01M 15/11* (2006.01)
(52) U.S. Cl. .................................. 73/114.04
(58) Field of Classification Search ............ 73/114.02, 73/114.04, 114.05
See application file for complete search history.

(56) References Cited

U.S. PATENT DOCUMENTS

| | | | | |
|---|---|---|---|---|
| 5,771,482 | A * | 6/1998 | Rizzoni | 701/101 |
| 7,158,875 | B2 * | 1/2007 | Yasui et al. | 701/111 |
| 7,334,552 | B2 * | 2/2008 | Moller et al. | 123/192.1 |
| 7,530,261 | B2 * | 5/2009 | Walters | 73/114.04 |
| 7,856,304 | B2 * | 12/2010 | Livshiz et al. | 701/103 |
| 8,091,410 | B2 * | 1/2012 | Malaczynski | 73/114.04 |
| 2008/0121212 | A1 * | 5/2008 | Livshiz et al. | 123/352 |

OTHER PUBLICATIONS

U.S. Appl. No. 11/769,797, filed Jun. 28, 2007, Michael Livshiz.

* cited by examiner

*Primary Examiner* — Freddie Kirkland, III

(57) ABSTRACT

A method of detecting a misfire of an engine includes determining a range of sub-harmonic frequencies of one of a crankshaft sensor signal and an engine speed signal. The range of sub-harmonic frequencies is determined based on a fundamental frequency. The sub-harmonic frequencies are less than the fundamental frequency. Frequency content magnitudes are generated based on the range of the sub-harmonic frequencies and a Discrete Fourier Transform of at least one of the crankshaft sensor signal and an engine speed signal. An energy from velocity non-uniformity (EVN) signal is generated based on the frequency content magnitudes and the range of the sub-harmonic frequencies. The misfire is detected based on the EVN signal and a misfire threshold.

20 Claims, 8 Drawing Sheets

ENGINE MISFIRE DETECTION SYSTEMS AND METHODS USING DISCRETE FOURIER TRANSFORM APPROXIMATION

FIELD

The present disclosure relates to engine misfire detection systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines (ICE) are powered by ignition and combustion of air/fuel mixtures in cylinders of the ICE. Pressures in the cylinders increase during combustion which produces drive torque. An engine misfire can occur when there is not an adequate build-up of pressure in a cylinder during a combustion cycle.

An engine misfire can result in degraded engine performance and an increase in emissions. Failure to detect an engine misfire during engine operation can result in damage to engine components. Also, false detection of an engine misfire can result in unwarranted vehicle service.

SUMMARY

In one embodiment, a method of detecting a misfire of an engine is provided. The method includes determining a range of sub-harmonic frequencies of at least one of a crankshaft sensor signal and an engine speed signal. The range of sub-harmonic frequencies is determined based on a fundamental frequency. The fundamental frequency may be associated with engine firing events. The sub-harmonic frequencies are less than the fundamental frequency. Frequency content magnitudes are generated based on the range of the sub-harmonic frequencies and a Discrete Fourier Transform of at least one of the crankshaft sensor signal and an engine speed signal. An energy from velocity non-uniformity (EVN) signal is generated based on the frequency content magnitudes and the range of the sub-harmonic frequencies. The misfire is detected based on the EVN signal and a misfire threshold.

Use of the Discrete Fourier Transform provides a computational advantage (reduced algebraic equations) over using other transforms, such as the Fast Fourier Transform. For example, only a few algebraic equations may be used when performing the Discrete Fourier Transform for specified sub-harmonic frequencies.

In other features, an engine misfire detection system is provided and includes a sampling control module, an analysis module and a status module. The sampling control module determines a range of sub-harmonic frequencies of at least one of a crankshaft sensor signal and an engine speed signal based on a fundamental frequency. The sub-harmonic frequencies are less than the fundamental frequency. The analysis module generates frequency content magnitudes based on the range of the sub-harmonic frequencies and based on a Discrete Fourier Transform of at least one of the crankshaft sensor signal and an engine speed signal. The analysis module generates an energy from velocity non-uniformity (EVN) signal based on the frequency content magnitudes of the sub-harmonic frequencies. The status module detects an engine misfire based on the EVN signal and a misfire threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
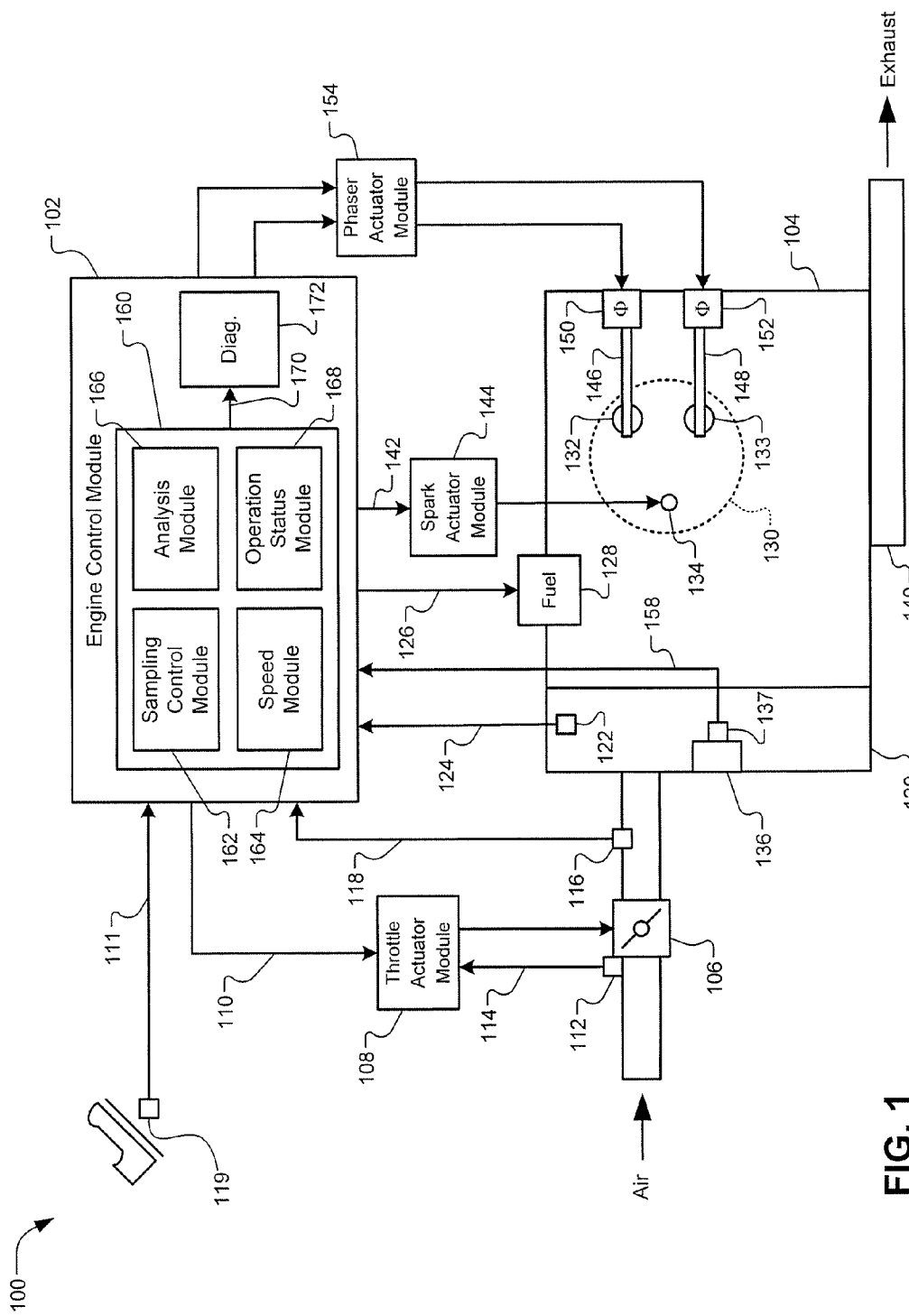
FIG. 1 is a functional block diagram of an engine control system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine misfire may be detected using a timing based method and/or a frequency based method. The timing method may include comparing a crankshaft speed signal within predefined calibration threshold values to detect an engine misfire. The timing method may also include determining a maximum difference between instantaneous crankshaft speed signals of different resolution time periods over an engine cycle. The maximum difference may be compared with other calibration threshold values. An instantaneous engine speed is determined using an engine speed calculation with an angular interval that is less than 360 crankshaft degrees.

For example, a first instantaneous crankshaft speed measured at a first crankshaft position may be compared with a second instantaneous crankshaft speed measured at a second crankshaft position. The instantaneous crankshaft speeds may be derived based on crankshaft sensor signals and respective first and second counters. The first crankshaft speed signal may have a first resolution that is greater than resolution of the second crankshaft speed signal. The result of the comparison may be compared with a maximum difference threshold to detect an engine misfire.

Since the timing method includes crankshaft speed signals that are generated based on a sensor gear (e.g., a gear with 58 teeth), misfire detection can be affected by high frequency components (e.g., noise and torsional vibrations) in the crankshaft speed signals. As an alternative to the timing method, the frequency method may be used. The frequency method is less susceptible to errors due to high frequency components than the timing method.

The frequency method may include frequency analysis of crankshaft sensor signals and/or crankshaft speed signals. The frequency method may include a Fast Fourier Transform (FFT) or a Discrete Fourier Transform (DFT) of the crankshaft sensor signals and/or the crankshaft speed signals. While frequency analysis is effective in processing data contaminated with noise and high-frequency torsional vibrations, a significant amount of processing time and memory are required to perform the analysis. A FFT and a DFT require a large amount of computations. A control module that performs the computations may not be able to complete the computations in a predetermined time period (i.e., the computations may not be performed quick enough for real-time performance).

The embodiments described herein are robust against high frequency components, such as noise and torsional vibrations, and minimize the number of computations performed to detect a misfire.

Referring now to FIG. 1, an engine control system 100 is shown. The engine control system 100 may include an engine control module (ECM) 102 and an engine 104. Air enters the engine 104 through a throttle 106. An opening of the throttle 106 may be controlled by a throttle actuator module 108. The ECM 102 may generate a throttle command signal 110 to operate the throttle actuator module 108. The ECM 102 may generate the throttle command signal 110 based on an accelerator pedal signal 111. The throttle 106 may include a throttle position sensor (TPS) 112, which generates a TPS signal 114. The throttle actuator module 108 may provide closed-loop control and operate the throttle 106 based on the throttle command signal 110 and the TPS signal 114. Air flow entering the throttle 106 may be detected by a mass air flow (MAF) sensor 116, which generates an MAF signal 118. An accelerator pedal sensor 119 may generate the accelerator pedal signal 111.

The engine 104 may include an intake manifold 120. Air enters the intake manifold 120 and creates an intake manifold pressure. The intake manifold pressure may be detected by a manifold absolute pressure (MAP) sensor 122, which generates a MAP signal 124.

The ECM 102 may generate a fuel command signal 126 to operate a fuel actuator 128. The fuel actuator 128 may be a fuel injector. The fuel actuator 128 provides a determined amount of fuel to the engine 104. The ECM 102 may generate the fuel command signal 126 based on the throttle command signal 110, the MAF signal 118 and the MAP signal 124.

The engine 104 may include a cylinder 130. The engine 104 may include $N_{cyl}$ cylinders, where $N_{cyl}$ is an integer. For illustrative purposes only, a single cylinder 130 is shown. An air/fuel mixture may enter the cylinder 130 through an intake valve 132. The air/fuel mixture may be ignited by a spark plug 134. Ignition of the air/fuel mixture results in combustion of the air/fuel mixture, which propels a piston (not shown) that drives a crankshaft 136. Speed of the crankshaft 136 may be detected by a crankshaft sensor 137, which generates a crankshaft speed signal 158. The combustion results in exhaust gas in the cylinder 130. The exhaust gas may be removed from the cylinder 130 through an exhaust valve 133, and exits the engine 104 via an exhaust system 140.

The ECM 102 may generate a spark command signal 142 that operates a spark actuator module 144. The spark actuator module 144 may provide electrical current to the spark plug 134 for spark generation and combustion purposes.

The ECM 102 may coordinate spark timing with timing of the intake valve 132 and the exhaust valve 133. The intake valve 132 may be actuated by an intake camshaft 146. The exhaust valve 133 may be actuated by an exhaust camshaft 148. Timing of the valves 132 and 133 may be adjusted respectively using an intake cam phaser 150 and an exhaust cam phaser 152. The ECM 102 may control a cam phaser actuator module 154 to operate the intake and exhaust cam phasers 150, 152.

The ECM 102 may include a misfire detection module 160. The engine misfire detection module 160 may include a sampling control module 162, a speed module 164, an analysis module 166 and an operation status module 168. The misfire detection module 160 may detect an engine misfire and generate a misfire status signal 170 based on the MAP sensor signal 124 and the crankshaft sensor signal 158. As an example, a misfire may be detected based on a fluctuation in the crankshaft sensor signal 158. The ECM 102 may also include a diagnosis module 172 that executes one or more engine diagnostic algorithms based on the misfire status signal 170.

Figure 2:
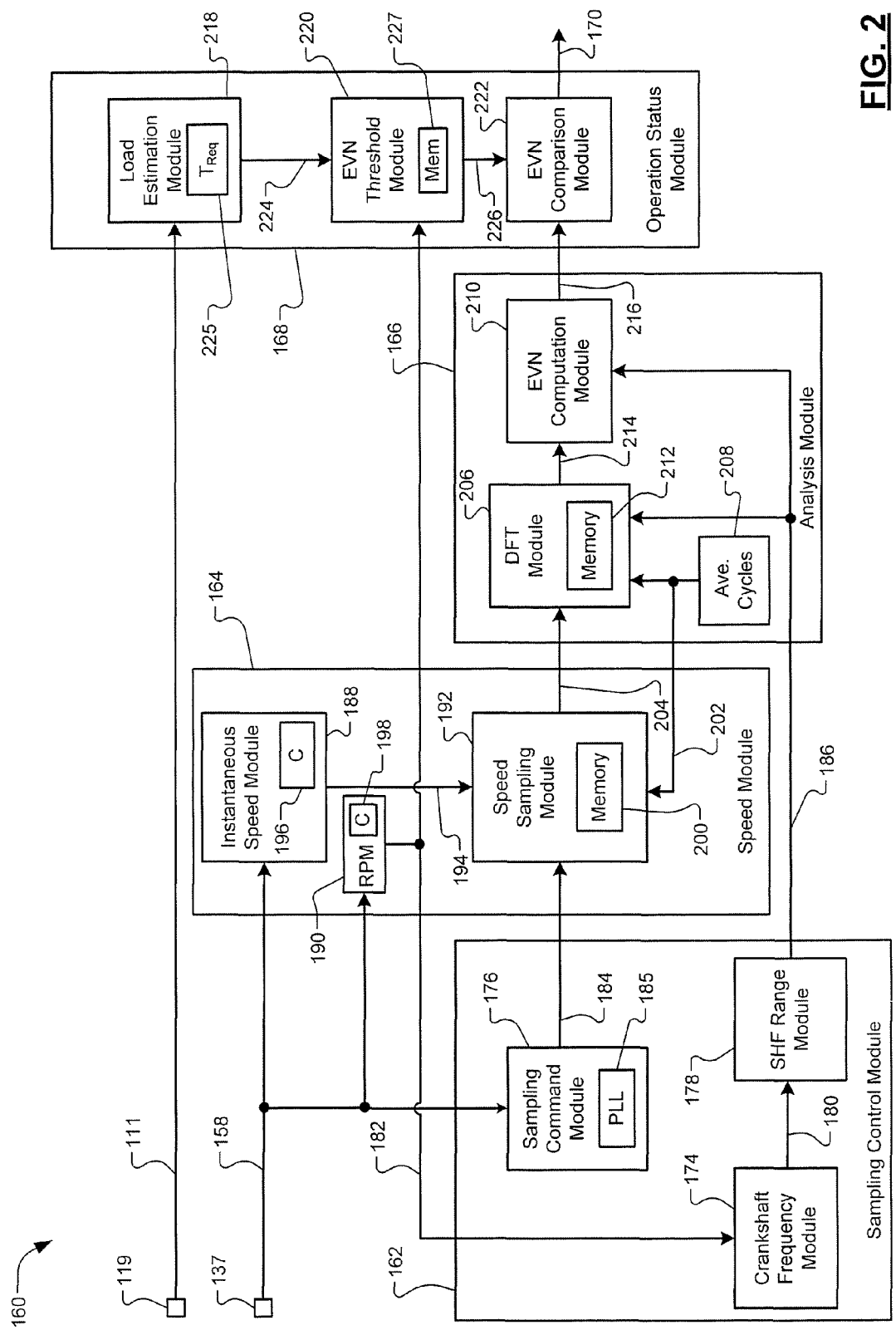
FIG. 2 is a functional block diagram of an engine misfire detection system according to the principle of the present disclosure.

FIG. 2 shows a functional block diagram of the misfire detection module 160 of FIG. 1. The accelerator pedal sensor 119 and the crankshaft sensor 137 provide respective signals 111, 158 to the misfire detection module 160.

The sampling control module 162 may include a crankshaft frequency module 174, a sampling command module 176 and a sub-harmonic frequency (SHF) range module 178. The crankshaft frequency module 174 may determine a fundamental frequency $\lambda_0$ and sub-harmonic frequencies of the crankshaft speed signal 182 (non-instantaneous speed signal). The crankshaft speed signal 182 may be generated based on the crankshaft sensor signal 158. The crankshaft frequency module 174 may generate a crankshaft frequency signal 180 may include the fundamental frequency $\lambda_0$ and the sub-harmonic frequencies. The fundamental frequency $\lambda_0$ may be an engine firing frequency (spark or ignition frequency). Sub-harmonic frequencies are frequencies less than the fundamental frequency $\lambda_0$.

The sampling command module 176 may generate a sampling command signal 184 based on the crankshaft sensor signal 158. The sampling command module 176 may include a phase-lock-loop module 185 that stabilizes a frequency of the sampling command signal 184. The SHF range module 178 may determine sub-harmonic frequencies and generate a SHF signal 186 based on the crankshaft frequency signal 180. The range of sub-harmonic frequencies may include an upper bound frequency $f_{ub}$ (first frequency) and a lower bound frequency $f_{lb}$ (second frequency), where $f_{ub} > f_{lb}$.

The speed module 164 may include an instantaneous speed module 188, a revolutions-per-minute (RPM) module 190 and a speed sampling module 192. The instantaneous speed module 188 may determine an instantaneous speed ω of the crankshaft 136 and generate an instantaneous speed signal 194 based on the crankshaft sensor signal 158. The instantaneous speed module 188 may use a counter 196 to determine the instantaneous speed ω.

The RPM module 190 may determine speed of the engine 104 and generate the engine speed signal 182 based on the crankshaft sensor signal 158. The RPM module 190 may use a counter 198 to determine the engine speed.

The speed sampling module 192 may generate engine speed samples ω(i), i=1, 2, ..., S based on the instantaneous speed signal 194, where S is the number of speed samples (e.g., S=120). The speed samples ω(i) may be generated at the sampling frequency $f_s$ according to the sampling command signal 184. The speed samples ω(i) may be stored in memory 200. The number of samples S may be determined based on an averaging-cycles signal 202 from an averaging cycles module 208. The speed sampling module 192 may generate one or more speed sample signals 204 based on the instantaneous speed signal 194, the sampling command signal 184 and the averaging-cycles signal 202.

The analysis module 166 may include a DFT module 206, the averaging-cycles module 208 and an energy from velocity non-uniformity (EVN) computation module 210. The DFT module 206 performs DFT approximation based on the averaging-cycles signal 202 and the speed sample signals 204. The DFT module 206 performs DFT approximation over a sub-harmonic frequency range determined by the SHF range module 178. The DFT module 206 generates frequency content magnitudes Ω(k) of the speed samples ω(i) by performing DFT approximation, where k=1, ..., S. The frequency content magnitudes represent the frequency content of one of a crankshaft sensor signal 158 and the instantaneous engine speed signal 194. The frequency content magnitudes Ω(k) may be stored in memory 212. The DFT module 206 may generate frequency content signals 214 based on the SHF range signal 186, the averaging-cycles signal 202, and the speed sample signals 204.

The averaging-cycles module 208 determines a number of averaging cycles $AC_{ave}$ and generates the averaging-cycles signal 202. Periods over which data is collected and averaged may be based on the number of averaging cycles. This is described in further detail below. The EVN computation module 210 determines EVN values and generates an EVN signal 216 based on the SHF range signal 186 and the frequency content signals 214.

The operation status module 168 may include a load estimation module 218, an EVN threshold module 220 and an EVN comparison module 222. The load estimation module 218 determines air loads of cylinders of the engine 104 and generate an air load signal 224 based on the accelerator pedal signal 111. The air loads may be characterized by levels of air-per-cylinder (APC) of the engine 104. The load estimation module 218 may include a torque request module 225 that determines a driver torque request based on the accelerator pedal signal 111. The EVN threshold module 220 may generate a misfire threshold signal 226 based on the engine speed signal 182 and the air load signal 224. The EVN comparison module 222 generates the misfire status signal 170 based on the EVN signal 216 and the misfire threshold signal 226.

Figure 3:
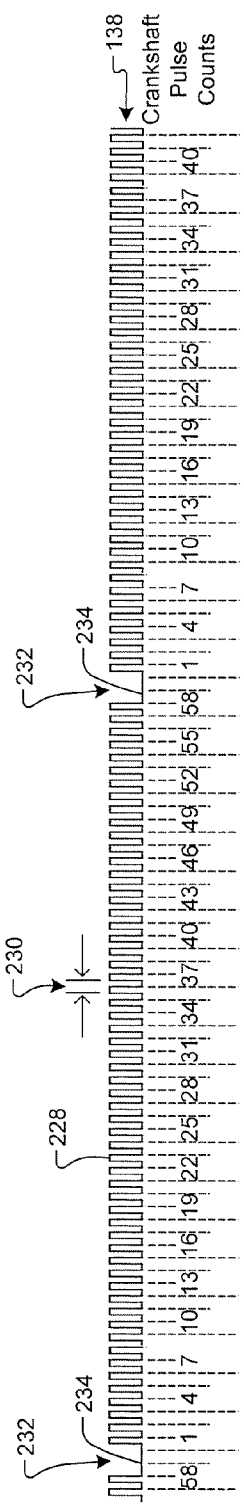
FIG. 3 is a plot of an exemplary crankshaft sensor signal.

Referring now also to FIG. 3, an exemplary plot of a crankshaft sensor signal 158 that includes multiple pulses 228 is shown. Each of the pulses 228 is associated with a fixed angular displacement 230 of the crankshaft. For example only, the displacement 230 may be a crankshaft angular displacement of 6°. One or more pulses 228 may be suppressed at a predetermined crankshaft position 232. For example, two pulses are suppressed in the crankshaft sensor signal 158 at the crankshaft position 232 for each revolution of the crankshaft. The crankshaft sensor 156 may generate 58 pulses per engine revolution. The crankshaft sensor 156 may be referred to as a 58× sensor. A portion of the crankshaft sensor signal 158 where a pulse is suppressed may be referred to as a "notch" 234 of the crankshaft sensor signal 158. A pulse train number may be assigned to each one of a train of pulses 228 following each of the notches 234. A crankshaft pulse count may be established using the pulse train number, as illustrated in FIG. 3.

The notches 234 of the crankshaft sensor signal 158 may be detected once per engine revolution. Speed of the engine may be determined based on detection of the notches 234. The RPM module 190 of FIG. 2 may determine the engine speed based on the detection of the notches 234.

Figure 4A:
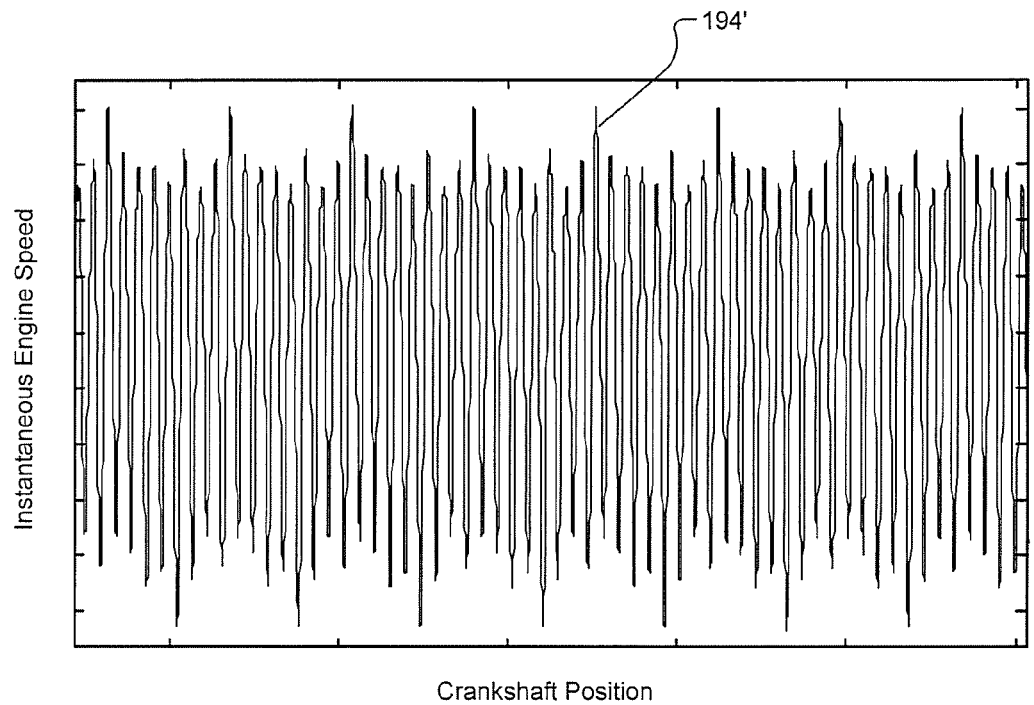
FIG. 4A is an exemplary plot of instantaneous engine speeds generated when there is not an engine misfire.
Figure 4B:
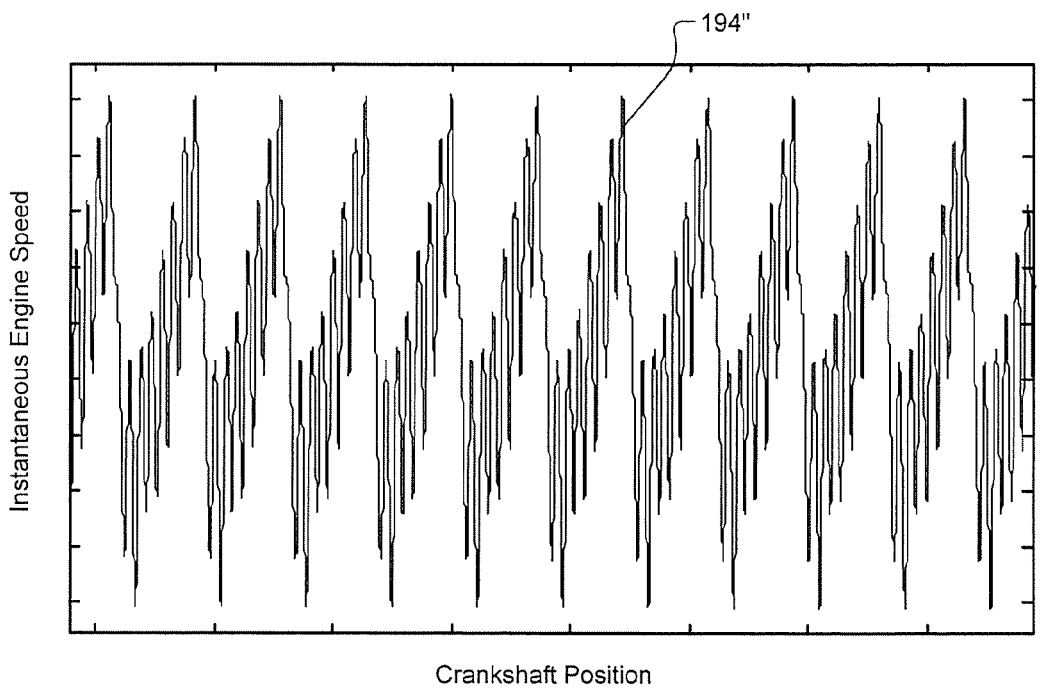
FIG. 4B is an exemplary plot of instantaneous engine speeds generated during an engine misfire.

Referring now also to FIGS. 4A and 4B, exemplary plots of engine speed signals are shown. FIG. 4(a) shows a plot 194' of instantaneous engine speeds of the engine 104 without engine misfires. FIG. 4(b) shows a plot 194" of instantaneous engine speeds of the engine 104 with engine misfires (single cylinder continuous misfire). The instantaneous engine speeds are updated based on corresponding pulses of the crankshaft sensor signals. The instantaneous speed module 188 of FIG. 2 may determine the instantaneous engine speeds.

Figure 5:
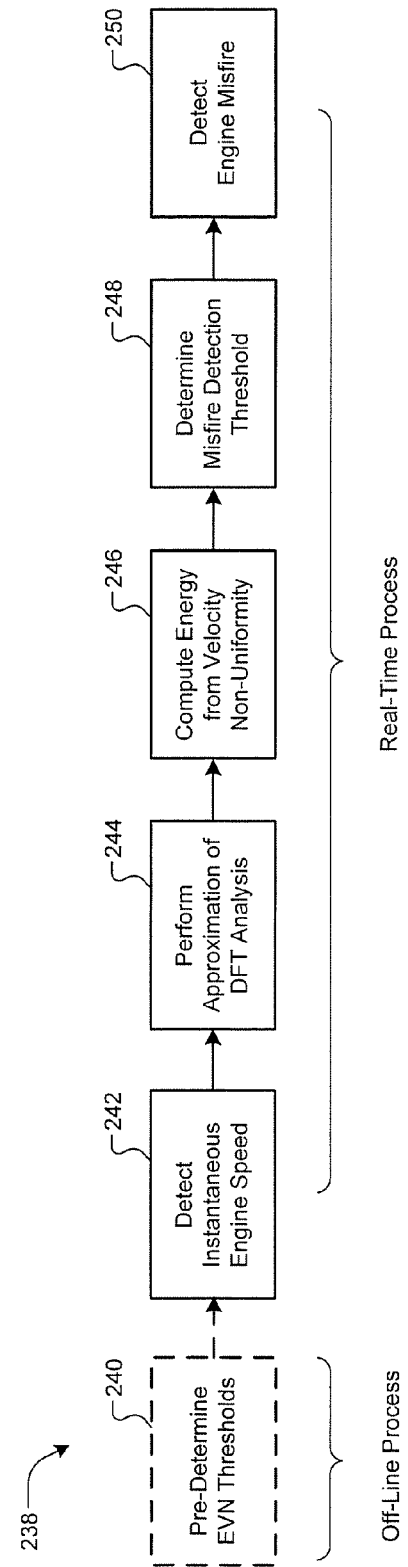
FIG. 5 illustrates a method of detecting an engine misfire according to the principles of the present disclosure.

In FIG. 5, an exemplary method 238 of detecting a misfire of an engine is shown. The method 238 may include an off-line process and a real-time process. The off-line process may include step 240 that performs an off-line process to collect pre-determined EVN threshold values based on an engine speed. The off-line process may be performed by operating the engine at predetermined operating conditions, for example, at a predetermined engine speed and with pre-determined air loads.

The real-time process may include steps 242-250 and include misfire detection based on an EVN value computed in real-time and one of the pre-determined EVN threshold values determined during a corresponding operating condition. Control of the engine misfire detection module 160 may execute associated steps of the real-time process.

In step 242, the engine misfire detection module 160 detects an instantaneous engine speed. The instantaneous engine speed may be determined based on the crankshaft sensor signal 158. The instantaneous engine speed may be determined based on a timing difference between two consecutive pulses 228 of the crankshaft sensor signal 158. The instantaneous engine speed may be sampled at a frequency equal to or greater than 2 times the fundamental frequency for the number of averaging cycles 202 to generate the speed samples ω(i) 204.

In step 244, the engine misfire detection module 160 performs DFT approximation. An example DFT expression of the crankshaft speed signal is provided by equation 1. A DFT analysis may be performed by computing frequency content magnitudes (output spectrum) Ω(k) of engine speed samples ω(i), for example, using one or more of equations 1-3 for the k-th sub-harmonic. Equation 3 is the magnitude of equation 2, which is derived from equation 1 using Euler's formula.

$$\Omega(k) = \sum_{n=1}^{S} \omega(n)\exp\left(-j\frac{2\pi(k-1)(n-1)}{S}\right) \quad (1)$$

$$k = 1, \ldots, S$$

$$\Omega(k) = \sum_{n=1}^{S} \omega(n)\left[\left(\cos\frac{2\pi(k-1)(n-1)}{S}\right) - j\sin\left(\frac{2\pi(k-1)(n-1)}{S}\right)\right] \quad (2)$$

$$|\Omega(k)| = \sum_{n=1}^{S} \omega(n)\sqrt{\left(\cos\frac{2\pi(k-1)(n-1)}{S}\right)^2 - \sin\left(\frac{2\pi(k-1)(n-1)}{S}\right)^2} \quad (3)$$

S is the number of speed or data samples processed during the DFT approximation process. As an example, the number of samples S may be equal to at least 2 times a fundamental frequency and for 2 engine cycles, which is at least $2*N_{cyl}$, samples. The frequency content magnitudes have real and imaginary portions, as shown in equation 2. The real and/or imaginary portions may be used for selected sub-harmonic frequencies to generate EVN values.

The DFT approximation process may be performed by computing frequency content magnitudes of $\Omega(k)$ of speed samples $\omega(i)$, for example, using one of equations 1-3, where k=1, ..., L, and L<S. L is the selected number of sub-harmonic data samples processed during the DFT approximation process.

In one embodiment, the approximation of DFT may be performed by computing frequency content magnitudes of $\Omega(k)$ of speed samples $\omega(i)$ within a selected range of sub-harmonic frequencies. This may be performed, for example, when k=$M_1$, ..., $M_n$ and expression 4 holds true.

$$M_n - M_1 + 1 < N_{cyl}, \text{ where } M_1 \geq 1 \quad (4)$$

The range of sub-harmonic frequencies may be specified by range indexes, such as M1 and Mn. M1 is a range index determined based on a lower bound frequency $f_{lb}$ of the SHF range. $M_n$ is a range index determined based on an upper bound frequency $f_{ub}$ of a SHF range.

In step 246, the engine misfire detection module 160 may determine EVN values or generate an EVN signal based on the frequency content magnitudes of $\Omega(k)$. The EVN values may be determined, for example, using equation 5.

$$EVN = \sqrt{\sum_{n_{sh}=M_1}^{M_n} |\Omega(n_{sh})|^2} \quad (5)$$

$n_{sh}$ is an index of sub-harmonic frequency. The EVN value is computed when the EVN computation module is operating within a sub-harmonic frequency range that is associated with the range indexes $M_1$ and $M_n$.

In step 248, the engine misfire detection module 160 may determine a misfire detection threshold for a current engine operating condition. The engine operating condition may be characterized by a speed and an air load of the engine. The engine misfire detection module 160 may select a misfire detection threshold from one of the pre-determined EVN threshold values. In step 250, the engine misfire detection module 160 may detect an engine misfire based on the computed EVN value and the misfire detection threshold.

Figure 6A:
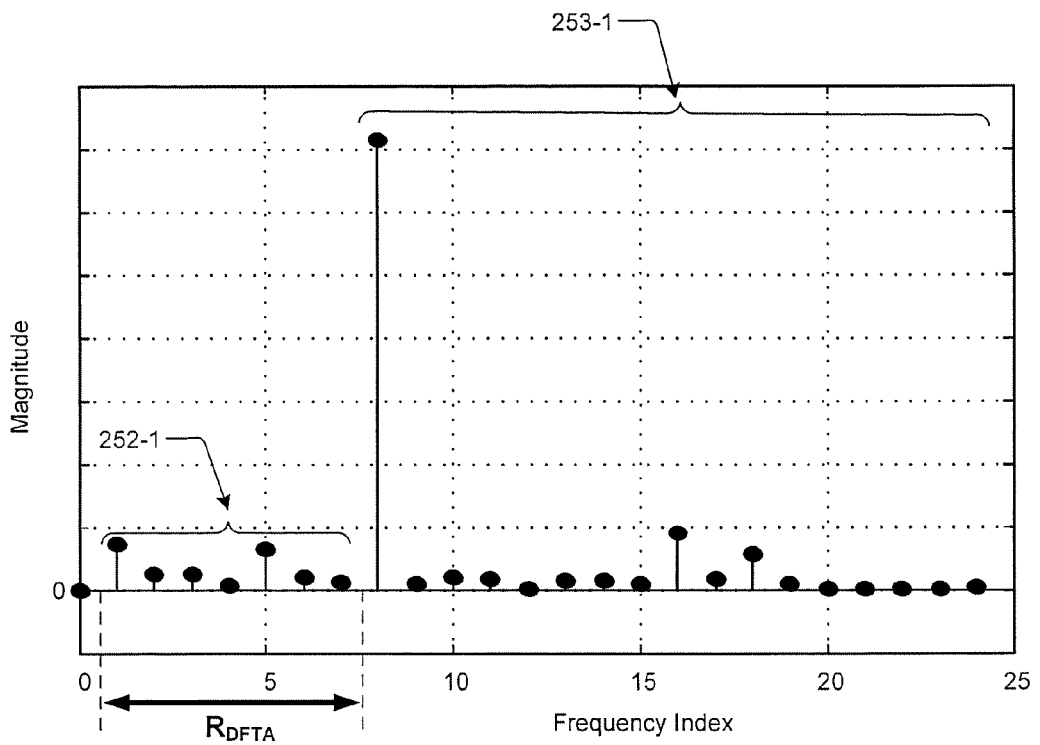
FIG. 6A is a plot of exemplary frequency content magnitudes of an engine speed signal generated when there is not an engine misfire according to the principles of the present disclosure.
Figure 6B:
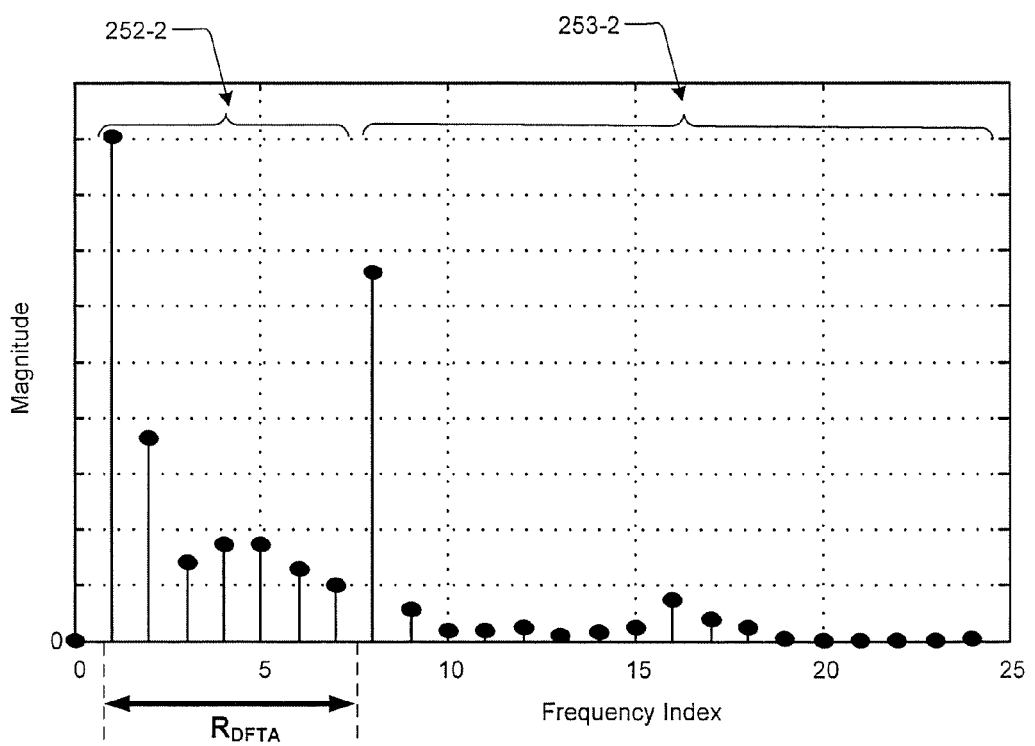
FIG. 6B is a plot of exemplary frequency content magnitudes of an engine speed signal generated during an engine misfire according to the principles of the present disclosure.
Figure 7A:
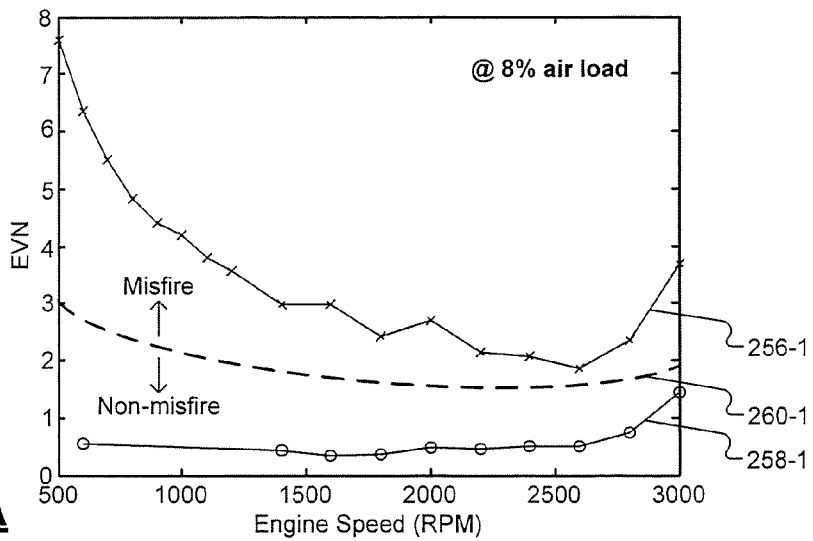
FIG. 7A-7C are plots of exemplary velocity non-uniformity signals generated for different air loads according to the principles of the present disclosure.
Figure 7B:
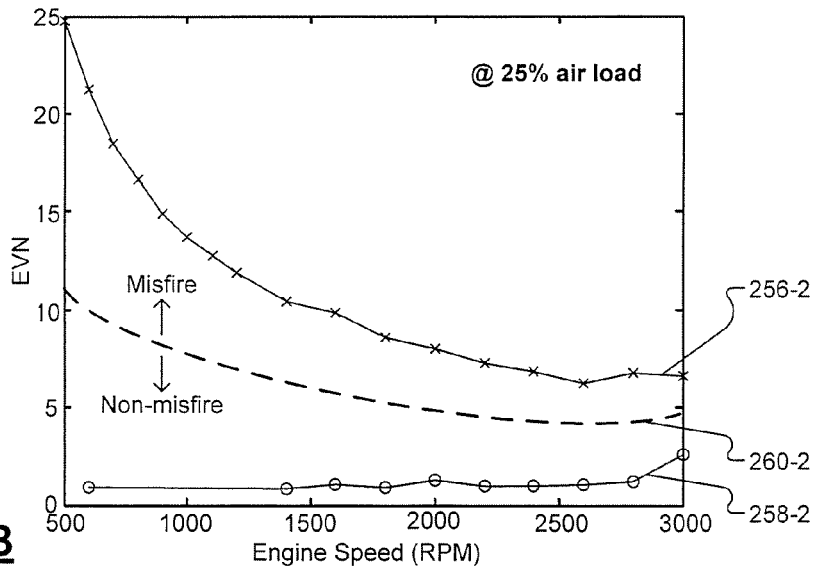
Figure 7C:
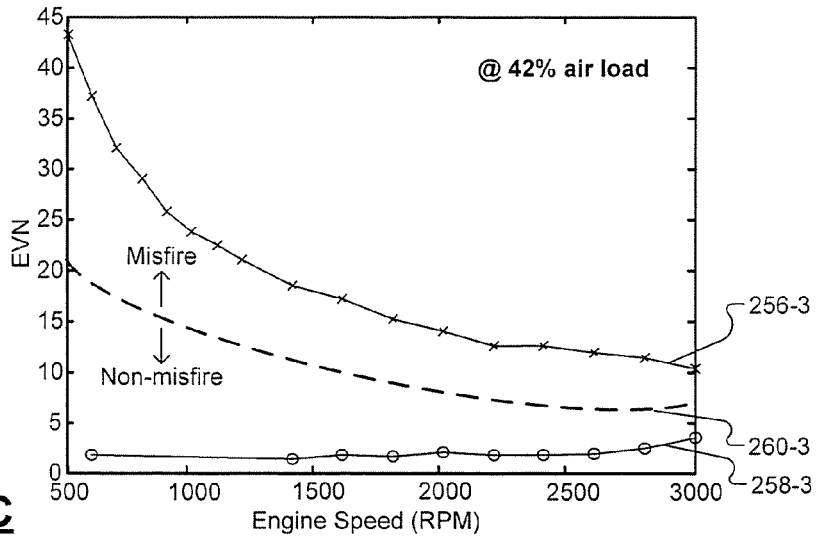

In FIGS. 6A and 6B, exemplary plots of frequency content magnitudes of crankshaft speed signals generated using DFT approximation are shown. FIG. 6(a) shows frequency content magnitudes of an engine speed signal generated when there is not an engine misfire. The frequency contents include a first portion 252-1 that is within a selected range $R_{DFTA}$ of sub-harmonics and a second portion 253-1 that is outside the selected range $R_{DFTA}$. FIG. 6(b) shows frequency content magnitudes of an engine speed signal generated during an engine misfire. The frequency content magnitudes include a first portion 252-2 that is within the selected range $R_{DFTA}$ of sub-harmonics and a second portion 253-2 that is outside the selected range $R_{DFTA}$.

Figure 8:
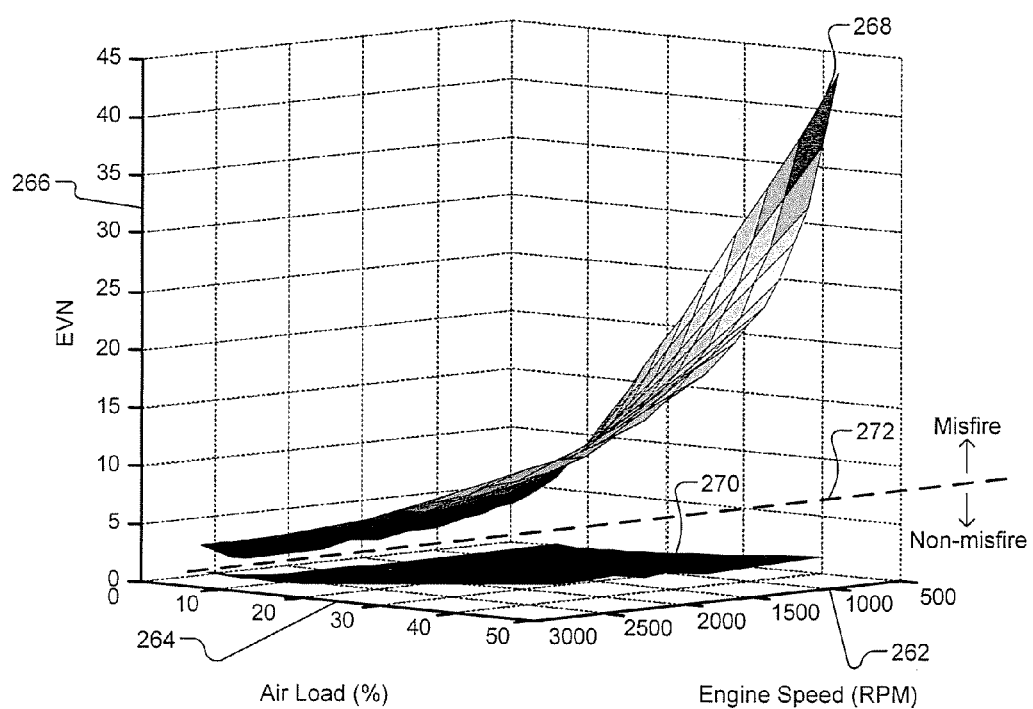
FIG. 8 is an exemplary plot of a 3-dimensional misfire threshold surface according to the principles of the present disclosure.

In FIGS. 8A-8B, plots of EVN values for various engine operating conditions, such as for different engine speeds and air load(s), are shown. FIG. 8(a) shows an example plot of EVN values for engine speeds of approximately 500-3000 RPM and an 8% air load. FIG. 8(b) shows an example plot of EVN values for engine speeds of approximately 500-3000 RPM and 25% air load. FIG. 8(c) shows an example plot of EVN values for engine speeds of approximately 500-3000 RPM and 42% air load.

Engine control may include operating conditions with associated air loads other than 8%, 25% or 42%. EVN curve 256 is generated based on the EVN values provided during an engine misfire. EVN curve 258 is generated based on the EVN values provided during a period that is absent of an engine misfire.

A misfire threshold curve 260 may be generated based on the misfire EVN curve 256 and the non-misfire EVN curve 258. The misfire threshold curve 260 may be determined for each respective engine operating condition. The misfire threshold curve 260 may be determined, for example, using an algebraic average of data from the misfire EVN curve 256 and the non-misfire EVN curve 258. Values of the misfire threshold curve 260 may be stored in memory 221 of FIG. 2. The misfire EVN curves 256 and non-misfire EVN curves 258 may be determined, for example, during testing and/or manufacturing of the engine 104.

Figure 9:
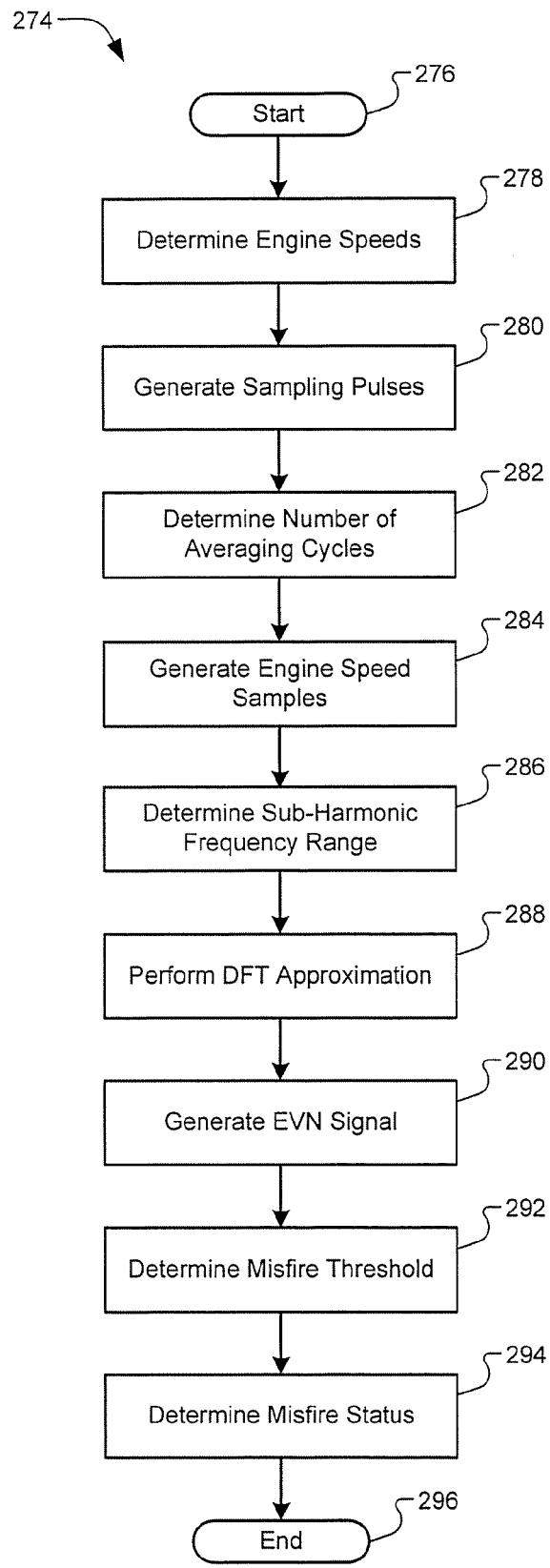
FIG. 9 illustrates a method of detecting an engine misfire according to the principles of the present disclosure.

In FIG. 9, a method of engine misfire detection using a 3-dimensional data structure is shown. The data structure uses engine speed as a first input 262 and air load as a second input 264. The data structure stores EVN values as output data 266. The misfire EVN curves 256 of FIG. 8 evaluated at various engine operation conditions may provide a 3-dimensional plot of values referred to as a "misfire EVN surface". A non-misfire EVN surface 270 may be generated based on the non-misfire EVN curves 258 of FIG. 8 evaluated at various engine operation conditions. A misfire threshold surface (shown as dashed line 272) may be generated based on the misfire EVN surface 268 and the non-misfire EVN surface 270. Misfires are associated with the EVN values that are greater than the misfire threshold surface 272. Values associated with the misfire threshold surface 272 may be stored in memory 221 of FIG. 2.

An engine misfire may be detected based on a computed EVN value and a misfire threshold value evaluated at an engine operating point characterized by engine speed and air load. A misfire can be detected when the EVN value is greater than the misfire threshold value. The engine speed may be determined by the RPM module 190 of FIG. 2. The air load may be determined by the load estimation module 218 of FIG. 2.

Referring now also to FIG. 10, a method 274 of detecting an engine misfire is shown. Control of the misfire detection module 160 may execute associated steps of the method 274. The method 274 may start at step 276.

In step 278, the misfire detection module 160 detects an engine speed signal. The engine speed signal may be the crankshaft sensor signal 158. An instantaneous speed ω of the crankshaft 136 may be determined. The instantaneous speed module 188 may determine the instantaneous speed ω based on the crankshaft sensor signal 158. The instantaneous speed ω may be determined based on a timing difference between two consecutive pulses 228 of the crankshaft sensor signal 158.

In step 278, an engine speed is determined. The RPM module 190 may determine the engine speed based on the crankshaft sensor signal 158. The engine speed may be determined based on timing associated with the notches 234 of the crankshaft sensor signal 158.

In step 280, the sampling control module 162 may generate sampling signals. The sampling signals may be generated based on the crankshaft sensor signal 158. Each of the pulses 228 of the crankshaft sensor signal 158 may be sampled. While the instantaneous engine speed may be subject to variation due to an engine misfire, the phase-lock-loop module 185 may stabilize a sampling frequency $f_s$ of the sampling signals.

In step 282, the averaging-cycles module 208 determines a number of averaging cycles $AC_{ave}$. Engine speed samples may be generated and stored according to duration of a corresponding number of averaging cycles. EVN values or other parameters, such as engine speed, air load, etc. may be averaged during an averaging cycle. Each averaging cycle corresponds to an engine cycle where the crankshaft 136 turns two revolutions or a 720-degree angular displacement. In one example embodiment, the number of averaging cycles $AC_{ave}$ is 1. In another example embodiment, the number of averaging cycles $AC_{ave}$ is 48. Other numbers of averaging cycles may be used.

In step 284, engine speed samples ω(i) are generated. The speed sampling module 192 may generate a speed sample at a frequency equal to or greater than 2 times the fundamental frequency to generate the speed samples ω(i) 204 based on the instantaneous speed signal generated in step 278. The speed sampling module 192 may generate a sequence of speed samples ω(i) for a predetermined number of averaging cycles, where i=1, . . . , S. For example, for each engine cycle, the crankshaft 136 turns two revolutions. An engine cycle may refer to 4 consecutive strokes, such as intake, compression, power, and exhaust strokes, of a cylinder of a 4-cycle engine. A sequence of speed samples may be generated when the instantaneous speed signals are sampled for one engine cycle. For example, 120 speed samples (1 per 6° of revolution of the crankshaft with synthesized pulses generated in the notch region) may be taken, where the crankshaft rotates twice per engine cycle. The speed samples ω(i) may be stored in memory 200.

In step 286, the sampling control module 162 determines a range of sub-harmonic frequencies. The SHF range module 178 may determine a set of range indexes based on the range. The SHF range module 178 may generate the SHF range signal 186 that corresponds to the range indexes.

The frequency module 174 may determine a fundamental frequency. The engine firing frequency λ may be used as a fundamental frequency $\lambda_0$. The engine firing frequency λ may be determined based on the engine speed and a number of cylinders $N_{cyl}$. The engine firing frequency λ may be determined, for example, using equation 6.

$$\lambda = (RPM * N_{cyl}/60)/2 \quad (6)$$

The fundamental frequency $\lambda_0$ may be determined, for example, using equation 7.

$$\lambda_0 = \lambda \quad (7)$$

The range may have a lower bound frequency $f_{lb}$ and an upper bound frequency $f_{ub}$. The lower bound index $M_1$ may be associated with the lower bound frequency $f_{lb}$. The upper bound index $M_n$ may be associated with the upper bound frequency $f_{ub}$. The range signal 186 may have the corresponding range indexes $M_1$ and $M_n$.

The range of sub-harmonic frequencies may be determined based on a kernel frequency $f_0$. The SHF range module 178 may determine the kernel frequency $f_0$ based on the fundamental frequency $\lambda_0$. The kernel frequency $f_0$ may be determined, for example, using equation 8, when engine speed samples are collected for one engine cycle.

$$f_0 = \frac{f_s}{S} = \frac{RPM}{120} = \frac{\lambda_0}{N_{cyl}} \quad (8)$$

The kernel frequency $f_0$ may be determined, for example, using equation 9 when engine speed samples are collected for multiple engine cycles.

$$f_0 = \frac{f_s}{S} = \frac{RPM}{120 N_{ave}} = \frac{\lambda_0}{N_{cyl} AC_{ave}} \quad (9)$$

Sub-harmonic frequencies may be generated based on the kernel frequency. A sub-harmonic frequency $f_{sh}$ may be generated as an integer multiple of the kernel frequency $f_0$. A sub-harmonic frequency $f_{sh}$ may be generated based on an SHF index $n_{sh}$, for example, using equation 10.

$$f_{sh} = n_{sh} * f_0 \quad (10)$$

The SHF index $n_{sh}$ may have a range specified, for example, by equation 11 when speed samples are collected for one engine cycle. This is due to the sub-harmonic frequencies being less than the fundamental frequency.

$$1 \leq n_{sh} \leq N_{cyl} - 1 \quad (11)$$

For an eight-cylinder engine, for example, $n_{sh}$ may have a range from 1 to 7. In this example, the range indexes have a lower bound index of 1 and an upper bound index of 7.

A SHF index $n_{sh}$ may have a range specified, for example, by equation 12, when speed samples are collected for multiple engine cycles.

$$1 \leq n_{sh} \leq N_{cyl} * AC_{ave} - 1 \quad (12)$$

In step 288, the analysis module 166 may perform DFT approximation. The DFT module 206 may perform a computation and generate frequency content magnitudes of Ω(k) of the speed samples ω(i). The DFT module 206 may generate the frequency content magnitudes of Ω(k) based on the engine speed samples and the range indexes of the sub-harmonic frequencies. The DFT approximation may be performed using equation 3.

In step 290, the EVN signal 216 is generated. The EVN computation module 210 may generate the EVN signal 216 based on the frequency content magnitudes of Ω(k) and the range of the sub-harmonic frequencies. The EVN signal 216 may be a Euclidean norm of the frequency content magnitudes of Ω(k) within the sub-harmonic frequency range. The EVN signal 216 may be generated using equation 4.

In one embodiment, the Euclidean norm may be evaluated using real and imaginary portions of the frequency content magnitudes. In another embodiment, the Euclidean norm may be evaluated using the real portion of the frequency content magnitudes of Ω(k) and not the imaginary portion. Equation 2 shows real and imaginary portions, where j is $\sqrt{-1}$ and is associated with the imaginary portion.

In step 292, a misfire threshold is determined. In one embodiment, the EVN threshold module 220 may generate the misfire threshold based on a misfire threshold curve 260 stored in memory 221. In another embodiment, the EVN threshold module 220 may generate the misfire threshold based on a misfire threshold surface 272 stored in memory 221. The EVN threshold module 220 may generate the misfire threshold based on the engine speed signal 182 and the engine air load signal 224.

An engine air load may be determined based on a level of air-per-cylinder (APC) of the engine. The APC may be determined based on a requested torque. A torque request module 225 may determine the requested torque based on an accelerator pedal signal 111. The APC may be determined using a method disclosed in a U.S. patent application Ser. No. 11/769, 797 filed on Jun. 28, 2007.

In step 294, an engine misfire status signal is generated. The EVN comparison module 222 may generate the engine misfire status signal 170 based on the EVN signal 216 and the misfire threshold signal 226. The misfire status signal 170 may indicate one of a MISFIRE and a NON-MISFIRE, for example, according to a comparison between the EVN signal 216 and the misfire threshold signal 226. See for example expressions 13 and 14.

$$\text{Misfire status=MISFIRE, if EVN} \geq \text{Misfire Threshold} \quad (13)$$

$$\text{Misfire status=NON-MISFIRE, if EVN} < \text{Misfire Threshold} \quad (14)$$

By using the above DFT approximation process that includes determination of EVN values, minimal and/or no effect from coefficient of variation of IMEP is reflected.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of detecting a misfire of an engine comprising:
   determining a range of sub-harmonic frequencies of one of a crankshaft sensor signal and an engine speed signal based on a fundamental frequency, wherein the sub-harmonic frequencies are less than the fundamental frequency;
   generating frequency content magnitudes based on the range of the sub-harmonic frequencies and based on a Discrete Fourier Transform of at least one of the crankshaft sensor signal and the engine speed signal;
   generating an energy from a velocity non-uniformity (EVN) signal based on the frequency content magnitudes and the range of the sub-harmonic frequencies; and
   detecting the misfire based on the EVN signal and a misfire threshold.

2. The method of claim 1, wherein the fundamental frequency is an engine firing frequency.

3. The method of claim 1, further comprising:
   generating a sampling command signal; and
   generating S engine speed samples based on the engine speed signal and the sampling command signal, where S is an integer greater than 1,
   wherein the frequency content magnitudes are generated based on the S engine speed samples.

4. The method of claim 1, wherein the EVN signal is a Euclidean norm of the frequency content magnitudes for selected frequencies within the range of the sub-harmonic frequencies.

5. The method of claim 1, wherein the frequency content magnitudes include a real portion and an imaginary portion, and
   wherein the EVN signal is generated based on at least one of the real portion and the imaginary portion.

6. The method of claim 1, further comprising generating the misfire threshold based on the engine speed signal and an air load of the engine.

7. The method of claim 6, wherein the air load is determined based on an air-per-cylinder value of the engine.

8. The method of claim 1, wherein the EVN signal is generated based on a first index and a second index of the range of sub-harmonic frequencies,
   wherein the first index is greater than the second index.

9. The method of claim 1, where in the frequency content magnitudes are generated based on a sum of resultant multiplications of engine speed samples by a square root of a square of cosines of $2\pi(k-1)(n-1)$ divided by a total number of engine speed samples plus a square of sines of $2\pi(k-1)(n-1)$ divided by a total number of engine speed samples, where k identifies a sub-harmonic and n identifies an engine speed sample.

10. The method of claim 1, wherein the EVN signal is generated based on a square root of a sum of ones of the frequency content magnitudes squared for sub-harmonic frequencies between a first range index and a second range index, and
    wherein the first range index is greater than the second range index.

11. An engine misfire detection system comprising:
    a sampling control module that determines a range of sub-harmonic frequencies of one of a crankshaft sensor signal and an engine speed signal based on a fundamental frequency, wherein the sub-harmonic frequencies are less than the fundamental frequency;
    an analysis module that generates frequency content magnitudes based on the range of the sub-harmonic frequencies and based on a Discrete Fourier Transform of at least one of the crankshaft sensor signal and the engine speed signal,
    wherein the analysis module generates an energy from a velocity non-uniformity (EVN) signal based on the frequency content magnitudes of the sub-harmonic frequencies; and
    a status module that detects an engine misfire based on the EVN signal and a misfire threshold.

12. The system of claim 11, wherein the fundamental frequency is an engine firing frequency.

13. The system of claim 11, wherein the sampling control module generates a sampling command signal and generates S engine speed samples based on the engine speed signal and the sampling command signal, where S is an integer greater than 1, and
    wherein the analysis module generates the frequency content magnitudes based on the S engine speed samples.

14. The system of claim 11, wherein the analysis module generates the EVN signal as a Euclidean norm of the frequency content magnitudes for selected frequencies within the range of the sub-harmonic frequencies.

15. The system of claim 11, wherein the frequency content magnitudes include a real portion and an imaginary portion, and
    wherein the EVN signal is generated based on at least one of the real portion and the imaginary portion.

16. The system of claim 11, wherein the status module generates the misfire threshold based on the engine speed signal and an air load of the engine.

17. The system of claim 16, wherein the status module determines the air load based on an air-per-cylinder value of the engine.

18. The system of claim 11, wherein analysis module generates the EVN signal based on a first index and a second index of the range of sub-harmonic frequencies, wherein the first index is greater than the second index.

19. The system of claim 11, wherein the analysis module generates the frequency content magnitudes based on a sum of resultant multiplications of engine speed samples by a square root of a square of cosines of $2\pi(k-1)(n-1)$ divided by a total number of engine speed samples plus a square of sines of $2\pi(k-1)(n-1)$ divided by a total number of engine speed samples, where k identifies a sub-harmonic and n identifies an engine speed sample.

20. The system of claim 11, wherein the analysis module generates the EVN signal based on a square root of a sum of ones of the frequency content magnitudes squared for sub-harmonic frequencies between a first range index and a second range index, and wherein the first range index is greater than the second range index.

* * * * *